UNITED STATES PATENT OFFICE.

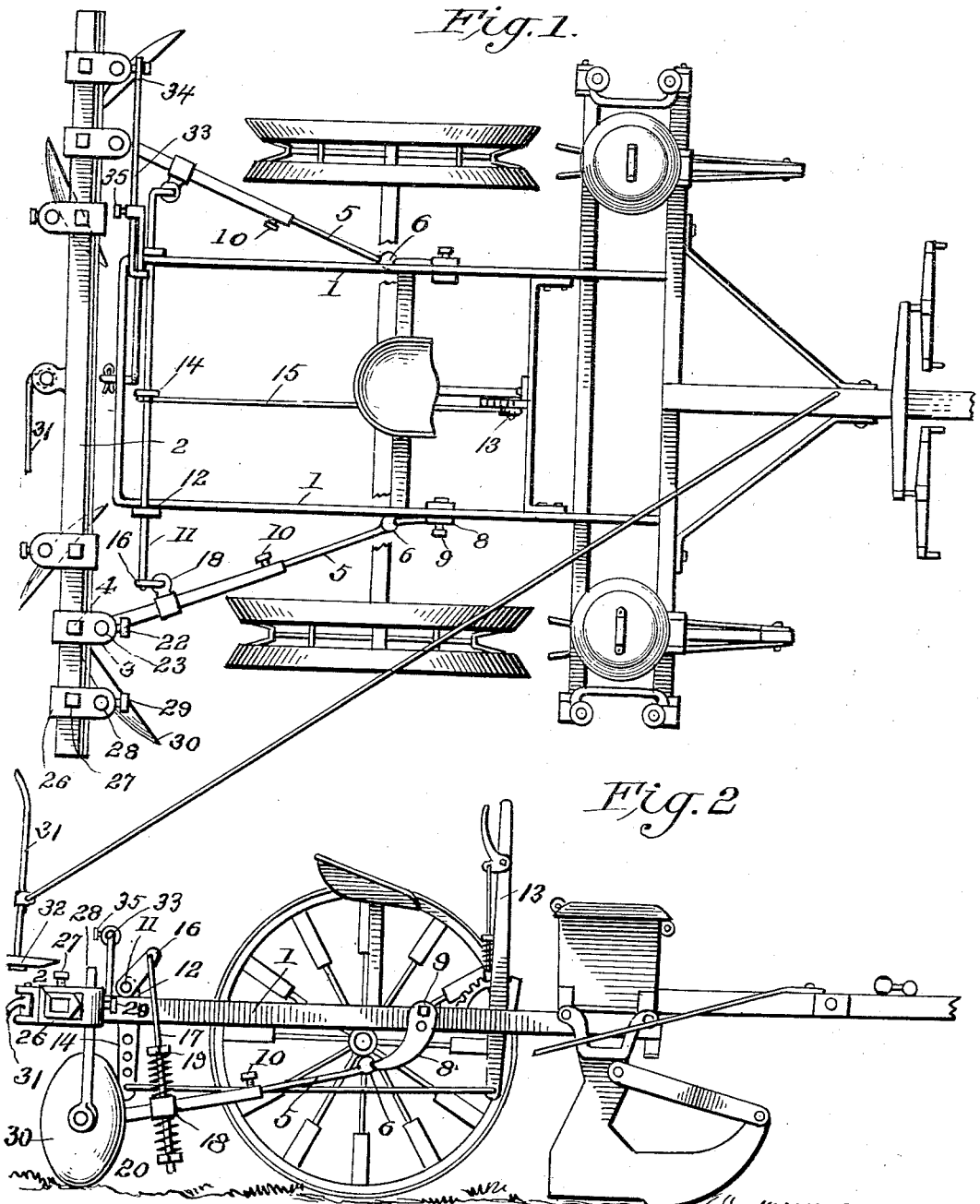

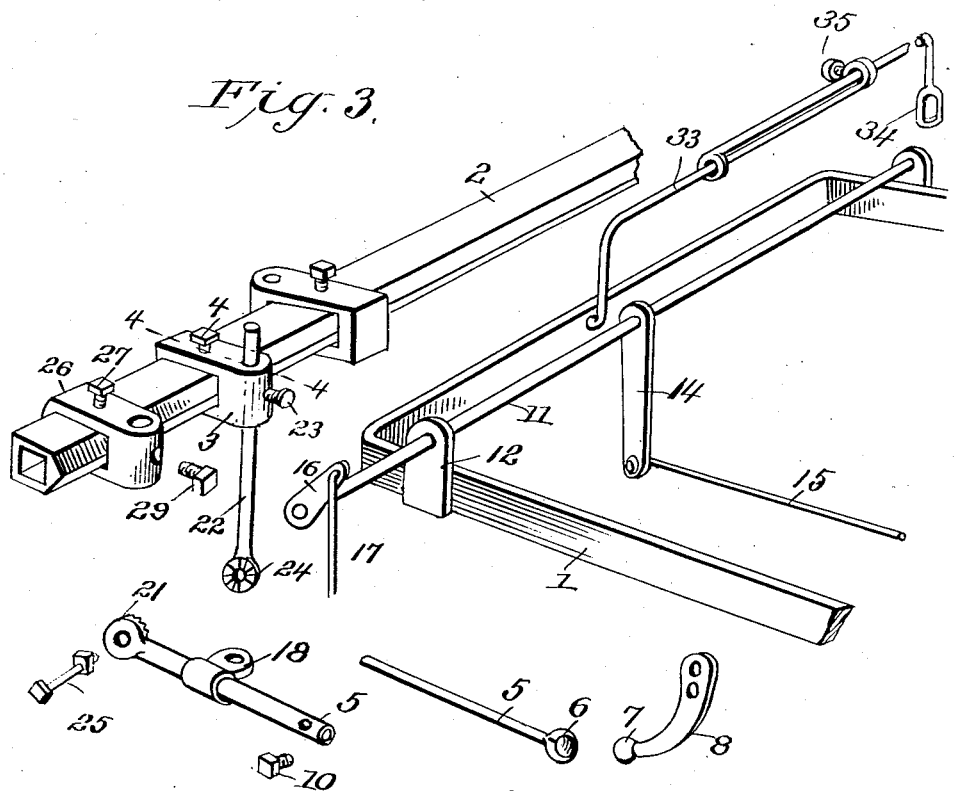
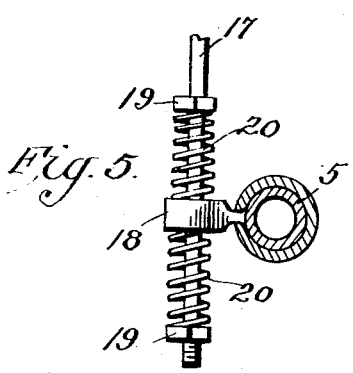
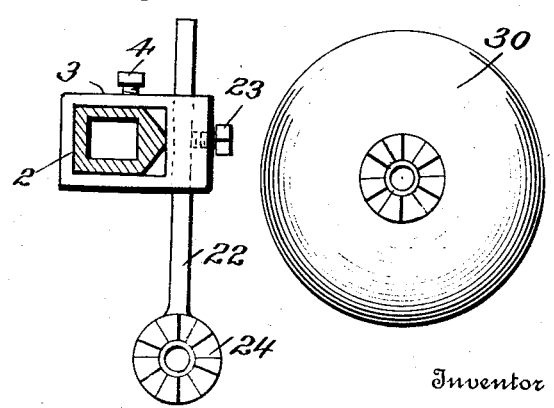

RUDOLF W. BRUENE, OF CUSHING, IOWA.

CULTIVATOR ATTACHMENT FOR PLANTERS.

1,062,882.  Specification of Letters Patent.  Patented May 27, 1913.

Application filed June 14, 1912. Serial No. 703,744.

*To all whom it may concern:*

Be it known that I, RUDOLF W. BRUENE, citizen of the United States, residing at Cushing, in the county of Woodbury and State of Iowa, have invented certain new and useful Improvements in Cultivator Attachments for Planters, of which the following is a specification.

This invention has relation to cultivator attachments especially adapted to be applied to the frame of a corn planter.

The object of the invention is to provide means for listing the soil upon the row in which the seed is planted, thereby forming a ridge and at the same time cultivating the soil in close proximity to the hills in which the seed is deposited. This will prevent washing of the soil and the rapid growth of weeds in close proximity to the plants as they come up, and consequently the plants may gain sufficient headway over the weeds in the immediate vicinity so that they will have ample opportunity to gain sustenance from the soil. At subsequent cultivations the weeds more remote from the plants of the crop may be removed. With this object in view the attachment consists of a bar with longitudinally extensible arms connected at their rear ends with the bar and at their forward ends with the sides of the planter frame. The marker usually carried by the planter frame is removed from the planter frame and attached to the bar, and a brace member is connected with the planter frame, and the said bar to counter-act the drag of the marker. Listing disks, or soil engaging members, are attached to the bar and are adapted to cast the soil up in a ridge over the rows in which the seed is planted.

In the accompanying drawings: Figure 1 is a top plan view of a planter with the attachment applied; Fig. 2 is a side elevation of the same; Fig. 3 is a perspective view of parts of the attachment detached; Fig. 4 is a transverse sectional view of the bar of the attachment cut on the line 4—4 of Fig. 3; Fig. 5 is a transverse sectional view of one of the arms of the attachment; Fig. 6 is a side elevation of a disk used on the attachment.

Corresponding and like parts are referred to in the following description and indicated in all the views of the accompanying drawings by the same reference characters.

The planter to which the attachment is applied may be of any usual pattern. For purposes of explanation the frame of the planter is designated at 1. The attachment consists of a hollow bar 2 which is angular in transverse section. Clips 3 are mounted upon the bar 2 and are held in adjusted positions thereon by means of set screws 4. Longitudinally extensible arms 5 are provided at their forward ends with sockets 6 which loosely receive knobs or balls 7 mounted upon castings 8. The said castings 8 are adjustably secured to the sides of the planter frame 1 by means of set screws 9. Each arm 5 consists of two members which telescopically engage each other and which are held in adjusted positions by means of set screws 10.

A shaft 11 is journaled in bearings 12 which are adjustably secured to the rear part of the frame 1. A lever 13 is mounted upon the forward part of the frame 1 in any suitable manner. An arm 14 depends from the shaft 11, and a rod 15 is pivotally connected at one end with the lower end of the lever 13 and pivotally connected at its other end with the arm 14. Arms 16 are carried at the ends of the shaft 11, and rods 17 are pivotally connected at their upper ends with the arms 16. The lower ends of the rods 17 pass through eyes 18 which are mounted upon the rear portions of the arms 5. Nuts 19 are mounted upon the rods 17 at the opposite sides of the eyes 18, and are spaced therefrom. Springs 20 are interposed between the said nuts and the eyes and surround the rods 17. The said springs are under tension with a tendency to resiliently hold the arms 5 approximately midway between the nuts 19. The arms 5 are provided at their rear ends with rosettes 21. Rods 22 are adjustably secured in the clips 3 by means of set screws 23. These rods are provided at their lower ends with rosettes 24 which are adapted to bear against the rosettes 21 carried at the rear ends of the arms 5. Bolts 25 pass through the rosettes 21 and 24 which are in contact with each other and serve as means for holding the rods 22 at adjusted angles with relation to the arms 5. Clips 26 are adjustably mounted upon the bar 2 and are held in adjusted positions thereon by means of set screws 27. Rods 28 are adjustably secured at their upper ends in the clips 26 by means of set screws 29.

Disks 30 are mounted for rotation at the lower ends of the rods 28. These disks are arranged in pairs and are pitched at an angle to the line of draft of a planter. The concaved sides of the members of each pair of disks are disposed toward each other. The marker staff 31 is removed from the back end of the frame 1 and is connected with the bar 2 in the usual manner in which it is ordinarily connected with the frame of a planter. This staff carries at its outer end the usual marking disk 32. A longitudinal extensible brace 33 is connected with the back end of the planter frame 1 at the point where the marked staff is usually connected, and the outer end of the said brace is provided with an eye 34 which engages the outermost set screw 29 at the opposite side of the planter frame from that to which the marker disk 32 is disposed. This brace is intended to prevent the drag of the marking disk from having a tendency to displace the bar 2 with relation to the frame of the planter. The brace 33 is preferably made up of regular sections as shown in Fig. 3 which slidably engage each other and which may be secured by means of a set screw 35 in adjusted positions, so that the said brace may be lengthened or shortened as desired.

The disks 30 are arranged to travel behind the wheels of the planter with one member of each pair of disks disposed approximately beyond the side of the wheel of the planter, and as the planter makes a course over the field and plants the seed, the wheels of the planter press the soil over the seed in the usual manner and the disks 30 list the soil in ridges over the rows. The soil thus moved by the disks 30 distributes or checks the growth of weeds in close proximity to the rows of the crop, and therefore the plants of the crop will have a better opportunity to absorb the sustenance from the soil when they start to come up. By having the arms 5 longitudinally extensible, the attachment may be adjusted to different types and sizes of planter frames. By swinging the lever 13 the disks 30 may be caused to operate at any desired depth in the soil. By pitching the rods 22 with relation to the arms 5 and thereby changing the angular relation of the said rods with respect to the arms, the bar 2 may be moved toward or away from the rear end of the planter frame 1 so that the parts of the attachment will have sufficient clearance with relation to the parts of the planter in order to permit of vertical adjustment of the soil engaging members of the attachment.

Having described the invention, what is claimed is:

1. A planter attachment comprising a bar, clips adjustably mounted thereon, rods adjustably mounted in the clips, longitudinally extensible arms adjustably connected with the rods, means for connecting the arms with the frame of a planter, other clips adjustably mounted upon the bar, rods adjustably mounted in the last-mentioned clips and carrying soil engaging members, a lever mechanism adapted to be mounted upon a planter frame, and means resiliently connecting said lever mechanism with said arms.

2. A planter attachment comprising a bar, means for connecting the bar with a planter frame, means for attachment with the planter frame for raising and lowering the bar, soil engaging members carried by the bar, a marker carried by and extending beyond the bar, and a brace member adapted to be connected with the planter frame and with the bar at the end portion thereof opposite that end beyond which the work engaging member of the marker is disposed.

3. A planter attachment comprising a bar, means adapted to connect the bar with a planter frame, means adapted to be mounted upon the planter frame for raising and lowering the bar, soil engaging members carried by and extending beyond the bar, a marker carried by the bar, and a longitudinally extensible brace adapted to be connected with the planter frame and connected with that end portion of the bar opposite the end thereof beyond which the soil engaging member of the marker is disposed.

In testimony whereof I affix my signature in presence of two witnesses.

RUDOLF W. BRUENE. [L. S.]

Witnesses:
W. L. PAGE,
JOE MARSHALL.